US011025649B1

(12) United States Patent
Bilge et al.

(10) Patent No.: US 11,025,649 B1
(45) Date of Patent: Jun. 1, 2021

(54) SYSTEMS AND METHODS FOR MALWARE CLASSIFICATION

(71) Applicant: Symantec Corporation, Mountain View, CA (US)

(72) Inventors: Leyla Bilge, Antibes (FR); Yufei Han, Biot (FR); Oystein Fladby, Klofta (NO)

(73) Assignee: NortonLifeLock Inc., Tempe, AZ (US)

( * ) Notice: Subject to any disclaimer, the term of this patent is extended or adjusted under 35 U.S.C. 154(b) by 239 days.

(21) Appl. No.: 16/019,166

(22) Filed: Jun. 26, 2018

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01)

(58) Field of Classification Search
CPC ............................. H04L 63/1416; G06N 20/00
See application file for complete search history.

(56) References Cited

U.S. PATENT DOCUMENTS

| | | | | |
|---|---|---|---|---|
| 10,089,576 | B2* | 10/2018 | Gao | G06F 16/9535 |
| 10,432,953 | B2* | 10/2019 | Wierstra | G06N 3/0445 |
| 2018/0288086 | A1* | 10/2018 | Amiri | G06F 40/126 |
| 2019/0236135 | A1* | 8/2019 | Tyamagondlu Nagabhushan | G06K 9/00442 |
| 2019/0266325 | A1* | 8/2019 | Scherman | G06F 40/289 |

OTHER PUBLICATIONS

Bojan Kolosnjaji et al. "Deep Learning for Classification of Malware System Call Sequences", 2016, AI 2016, LNAI 9992, pp. 137-149 (Year: 2016).*
Karbab et al., "Android Malware Detection using Deep Learning on API Method Sequences", Cryptography and Security, Dec. 27, 2017, pp. 1-17.
David et al., "DeepSign: Deep Learning for Automatic Malware Signature Generation and Classification", International Joint Conference on Neural Networks (IJCNN), Jul. 1, 2015, 8 pages.
Kolosnjaji et al., "Deep Learning for Classification of Malware System Call Sequences", Australasian Joint Conference on Artificial Intelligence, Advances in Artificial Intelligence, Nov. 29, 2017, pp. 1-12.

* cited by examiner

*Primary Examiner* — Daniel B Potratz
*Assistant Examiner* — Wansik You
(74) *Attorney, Agent, or Firm* — FisherBroyles, LLP

(57) ABSTRACT

The disclosed computer-implemented method for malware classification may include receiving dynamic analysis traces that include event descriptions regarding malware programs, and labels regarding classes of malware programs; performing a first mapping of the event descriptions to a first set of vector representations, wherein order of the events is not taken into account by the first mapping; performing a second mapping of the event descriptions to a second set of vector representations, wherein order of the events is taken into account by the second mapping; combining the first set of vector representations and the second set of vector representations into a combined set of vector representations; inputting the combined set of vector representations, along with the labels, into an autoencoder; and training the autoencoder to generate a feature space representation that correlates identified features with classes of malware. Various other methods, systems, and computer-readable media are also disclosed.

20 Claims, 11 Drawing Sheets

SYSTEMS AND METHODS FOR MALWARE CLASSIFICATION

BACKGROUND

"Malware" (i.e., malicious software) is a term used to describe a variety of forms of hostile, intrusive, and/or annoying software or program code. Examples include, but are not limited to: worms, viruses, Trojan horses, spyware, ransomware, adware, bots, and rootkits. Traditional malware detection systems that rely on static analysis (i.e., examining the code) unfortunately become ineffective when malware is packed and/or polymorphic (i.e., changes its identifiable features). "Packed" refers to compressing an executable file and combining the compressed data with decompression code into a single executable. According to recent studies on current malware, around 65% of malware is packed or polymorphic in order to evade detection systems that perform static analysis.

The cyber community often deploys sandboxing systems (dynamic analysis systems that execute potential malware in a controlled environment), in addition to the traditional malware defenses, in order to enhance the security of enterprises. Examples of controlled environments may include emulators (memory, CPU, full-system), virtual machines, and/or network simulation. In a sandbox, a binary file that cannot be classified as malware or benign may be executed dynamically such that its behavior may be observed and a more accurate classification made.

However, execution, observation, and classification of potential malware are time-consuming steps. Since 2007, the number of malware samples has increased from approximately 1 million per year to one billion per year, and that number continues to increase, at roughly an order of magnitude every 30 months. Therefore, traditional methods of dynamic analysis that require manual observation and classification are becoming impractical.

Dynamic analysis software typically produces dynamic traces, which describe the behavior of suspect software when it is executed (in a sandbox, for example). Such traces may include function call traces, which consist of the sequence of functions that were invoked by the program under analysis, along with the passed arguments. Other traces may describe function parameters (values passed when a function is invoked); information flow; file operation; mutex (mutual exclusion) object creation; domain names, IP addresses, and registries accessed; SSL connections; file operation; and/or executed machine instructions.

While many dynamic trace analysis systems exist, they tend to suffer from various deficiencies. In particular, they tend to focus on only one aspect of the traces, and ignore other information that may be used to classify and identify malware. Moreover, currently the discovery of dynamic analysis patterns that are used for identifying malware may require a heavy manual effort (e.g., reverse-engineering the malware behavior by a security analyst).

The instant disclosure describes improved systems and methods for malware classification.

SUMMARY

As will be described in greater detail below, the instant disclosure describes various systems and methods for malware classification.

In one example, a method for malware classification performed by one or more computing devices having at least one processor may include receiving, by the one or more computing devices, one or more dynamic analysis traces regarding a plurality of malware programs, wherein the dynamic analysis traces comprise event descriptions that describe one or more events arising from behavior of the plurality of malware programs when executed in a controlled environment. The method may further include receiving, by the one or more computing devices, one or more labels regarding classes of malware programs; and performing, by the one or more computing devices, a first mapping of the event descriptions to a first set of vector representations, wherein order of the one or more events is not taken into account by the first mapping. Further steps may include performing, by the one or more computing devices, a second mapping of the event descriptions to a second set of vector representations, wherein order of the one or more events is taken into account by the second mapping; and combining, by the one or more computing devices, the first set of vector representations and the second set of vector representations into a combined set of vector representations. Subsequent steps may include inputting, by the one or more computing devices, the combined set of vector representations, along with the labels, into an autoencoder; and training, by the one or more computing devices, the autoencoder to generate a feature space representation that correlates identified features with one or more classes of malware.

Additional steps may include detecting, by the one or more computing devices, computer malware based on output of the trained autoencoder; and, in response to detecting the computer malware, performing, by the one or more computing devices, a security action to protect the one or more computing devices from the detected computer malware. The security may include one or more of: powering down, turning off, quarantining, sandboxing, inoculating, isolating, throttling, or inhibiting one or more computing resources.

In one or more embodiments, the autoencoder may include a variational encoder. In an embodiment, the first mapping may include a bags-of-words analysis or a skip-gram embedding. In an embodiment, the second mapping may include one or more recurrent neural networks or an N-gram analysis. In some embodiments, the combined set of vector representations may include linear or non-linear combinations of vectors from the first set of vector representations and the second set of vector representations.

In one embodiment, a system for malware classification may include several modules stored in memory, including a receiving module, stored in memory and implemented by one or more processors, that receives one or more dynamic analysis traces regarding a plurality of malware programs, wherein the dynamic analysis traces may comprise event descriptions that describe one or more events arising from behavior of the plurality of malware programs when executed in a controlled environment, and further receives one or more labels regarding classes of malware programs. The system may further include an unordered event analysis module, stored in memory and implemented by one or more processors, that performs a first mapping of the event descriptions to a first set of vector representations, wherein order of the one or more events is not taken into account by the first mapping; an ordered event analysis module, stored in memory and implemented by one or more processors, that performs a second mapping of the event descriptions to a second set of vector representations, wherein order of the one or more events is taken into account by the second mapping; and an autoencoder module, stored in memory and implemented by one or more processors, that receives, along with the labels, a combined set of vector representations that is a combination of the first set of vector representations and the second set of vector representations, and that uses an autoencoder to map the combined set of vector representations to a feature space representation that correlates identified features with one or more classes of malware.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive one or more dynamic analysis traces regarding a plurality of malware programs, wherein the dynamic analysis traces comprise event descriptions that describe one or more events arising from behavior of the plurality of malware programs when executed in a controlled environment. The computer-readable medium may further include one or more computer-executable instructions that, when executed by at least one processor of a computing device, may cause the computing device to receive one or more labels regarding classes of malware programs. Further instructions may cause the computing device to perform a first mapping of the event descriptions to a first set of vector representations, wherein order of the one or more events is not taken into account by the first mapping. Additional instructions may cause the computing device to perform a second mapping of the event descriptions to a second set of vector representations, wherein order of the one or more events is taken into account by the second mapping; and combining, by the one or more computing devices, the first set of vector representations and the second set of vector representations into a combined set of vector representations. Instructions also may cause the computing device to input the combined set of vector representations, along with the labels, into an autoencoder, and to train the autoencoder to generate a feature space representation that correlates identified features with one or more classes of malware.

Features from any of the above-mentioned embodiments may be used in combination with one another in accordance with the principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
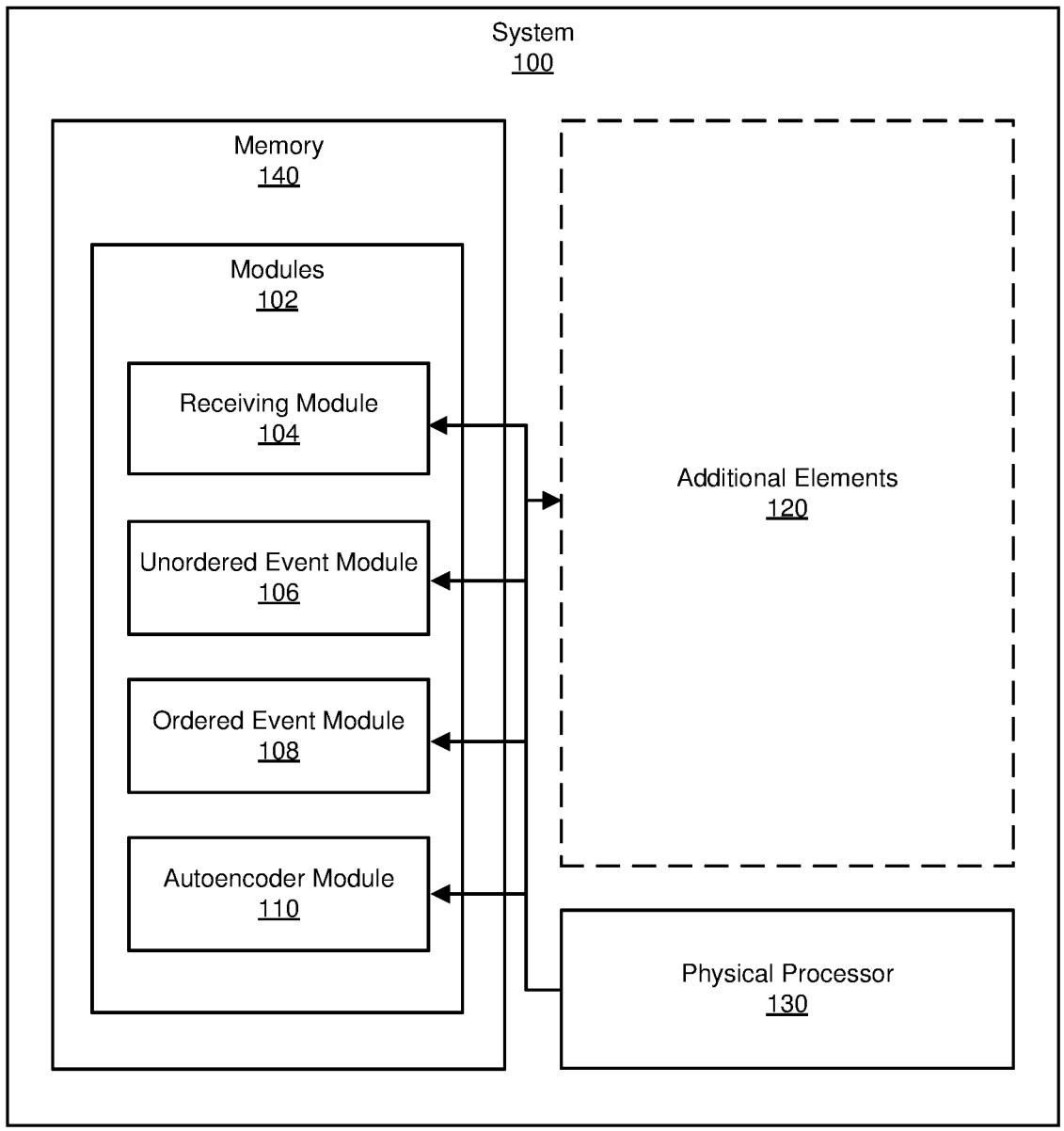
FIG. 1 is a block diagram of an example system for malware classification.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for malware classification.

As will be explained in greater detail below, a method embodiment may comprise performing feature significance testing in order to identify the more discriminative features for a particular malware classification problem. An embodiment may comprise one or more supervised neural networks that are trained over a sample set in order to identify and classify out-of-sample malware.

A neural network may be viewed as a mapping of one set of vectors to another set of vectors (or scalars), via specific mappings that may include various weighted transformations. The mapped (output) vectors are typically of lower dimension than the input vectors (and may be scalars). When applied to training data, a network may "learn" how to best transform the data by varying the weights so that a loss (or cost) function that measures the difference between the input training data and the output (mapped) data is optimized. In other words, neural networks may search through a solution space to find a mapping that has the smallest possible loss or cost.

A supervised neural network may accept as input a sample pair (X, Y) and seek to find a mapping that matches the input data. For example, if sample vectors X are known to be members of class Y, then the goal may be to have the network learn which features are related to being a member of class Y, so that when out-of-sample vectors are input into the network, the network is able to determine whether those vectors are likely to be members of class Y.

An example embodiment may comprise receiving as input dynamic traces generated by a malware analysis product. Such dynamic traces may describe, without limitation, one or more of the following behaviors/actions performed by known malware: (i) file creation, deletion and modifications; (ii) mutex creation details; (iii) list of domain names accessed; (iv) list of IP addresses contacted; (v) list of processes created; (vi) if SSL connections are made, the details about certificates; (vii) registry access behavior; etc. An example of an open source sandbox/malware analysis product is Cuckoo, although any product or process that generates dynamic analysis traces would be suitable. Examples of other sources for dynamic analysis traces include malware on Windows and on mobile operating systems such IOS and Android. In an embodiment, the traces (text files) may be mapped to vectors (e.g., binary bit strings) in order to serve as input to one or more neural networks.

In an embodiment, N-grams and/or bags-of-words may be included in modules that preprocess dynamic trace data. N-grams and bags-of-words module functionality may be illustrated by the following example in which a sequence of dynamic traces of operations is received (e.g., File operation: open/close/move/delete, IP addresses accessed, SSL connection accessed, etc.) in the form: Operation 1 (at time step 1), Operation 2 (at time step 2), Operation 3 (at time step 3) . . . Operation k (at time step k), . . . , Operation N (at time step N).

N-grams are ordered string patterns. For events that are ordered sequentially, an embodiment may perform an N-grams analysis on the bare event string values and all of the possible substrings that can be generated from those events. An N-gram may be, e.g., a consecutive subsequence of length n of some sequence of words $x_1, \ldots, x_n$. For example, 2-grams of the dynamic traces in the above example would be: (Operation 1, Operation 2), . . . , (Operation k−1, Operation k).

Bags-of-words are unordered string patterns, and may focus, for example, only on the occurrence frequency of single operations or combinations of operations. For the above dynamic traces example, bags-of-words processing may provide: (Operation k, 3 occurrences); (Operation k+Operation j, 10 occurrences); etc.

Skip-gram and recurrent neural networks may be applied over the low-level features extracted by N-grams and/or bags-of-words. Bags-of-words processing may be used to filter unordered string patterns that have a frequency of occurrence that is either too high or too low. Undesired string patterns may include, for example, common patterns also shared by benign files and/or noisy patterns (e.g., that have no utility). Filtered unordered string patterns output by a bags-of-words module may be used as input to a skip-gram embedding module. The output of the skip-gram embedding module (described in more detail below) may be a single vector containing, for every operation i in the given dynamic traces, the probability that a randomly selected nearby operation is operation j.

In an embodiment, operation of a skip-gram embedding module may be as follows: first, receive N-grams of raw dynamic operation traces, assuming N different operations in total. Next, organize the N-grams into training data of the skip-gram module. Each training sample may be as depicted in Table 1 below.

Given an N-gram pattern (Operation 1, Operation 2, Operation 3):

| Training Feature | Training target |
|---|---|
| Operation 1 (the context operation) | Operation 2 (the target operation) |
| Operation 3 (the context operation) | Operation 2 (the target operation) |
| Operation 1 (the context operation), | Operation 3 (the target operation) |
| Operation 2 (the context operation) | Operation 3 (the target operation) |

Figure 5:
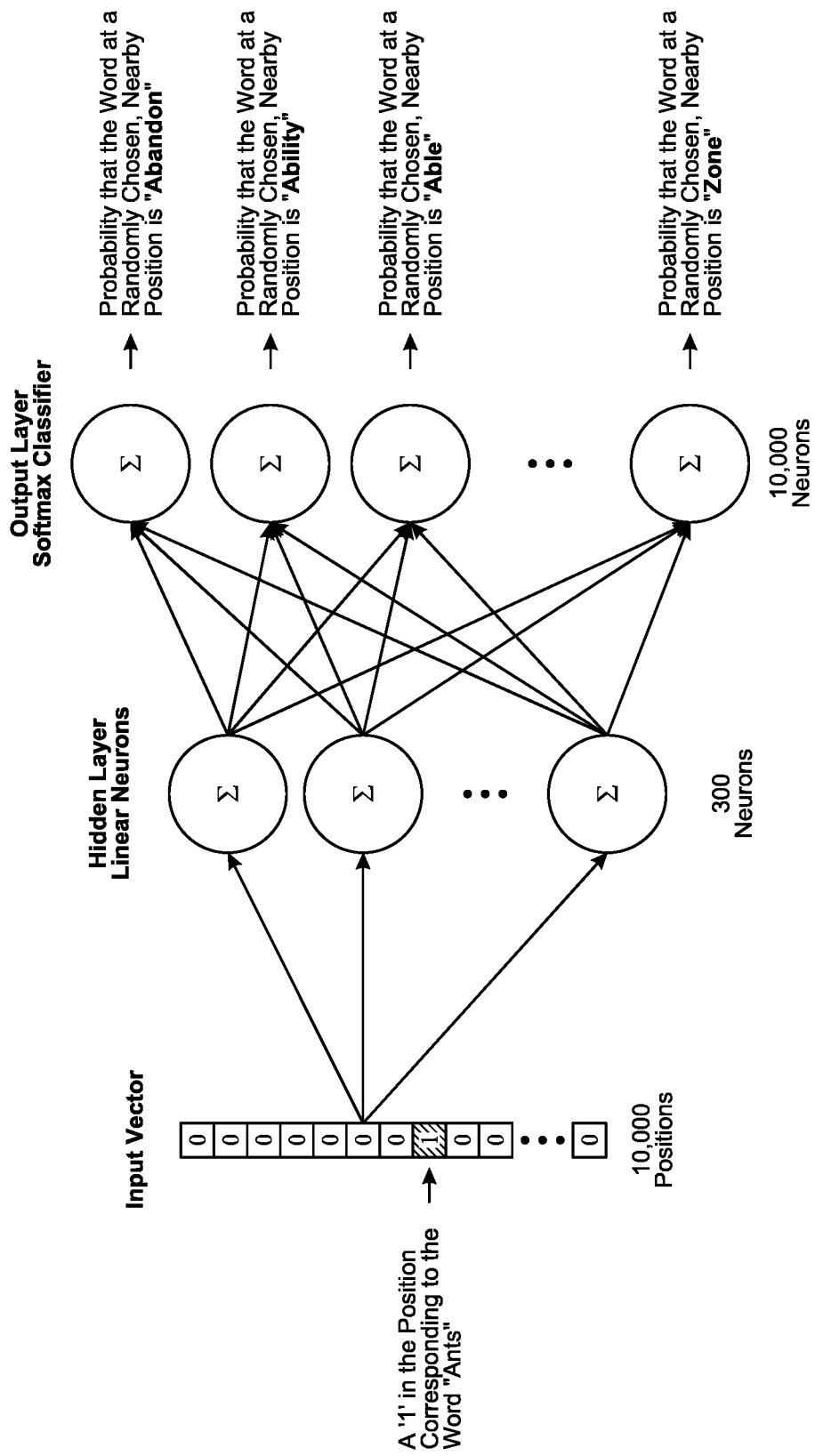
Figure 6:
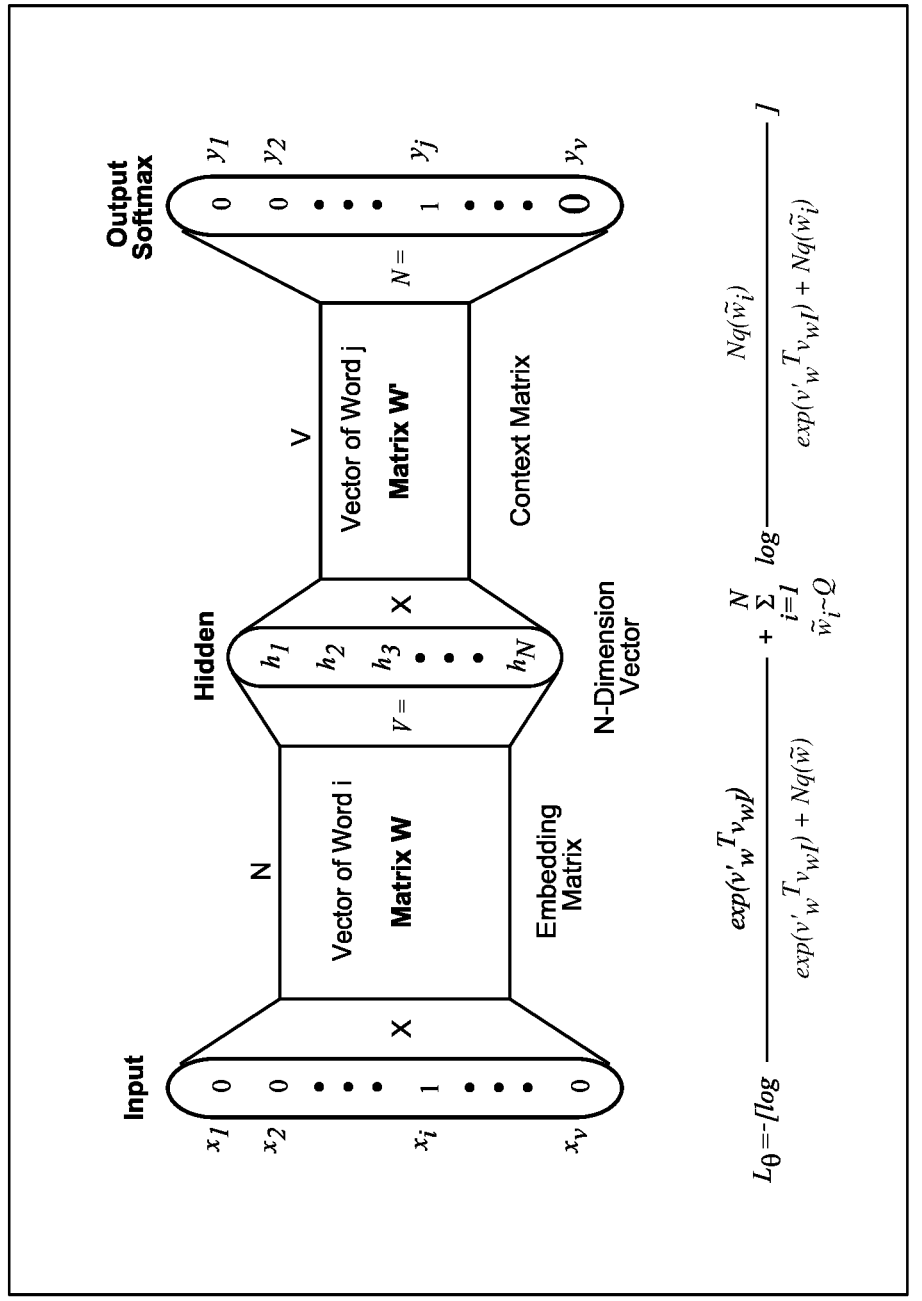

In this example, the next step may be to map each pair of [training feature, training target] data to a one-hot encoded vector. A one-hot encoded vector may consist of zeros in all cells with the exception of a single 1 in a cell used uniquely to identify the word. The following step may be used to train a neural network that includes a hidden layer of linear neurons (the linear weighted combinations of input one-hot encoded vectors) and a softmax classifier (the non-linear combination of output from the hidden layer), and to provide a probabilistic estimate of occurrence of target operations. Examples of structures that may be used in skip-gram modules are shown in FIGS. 5 and 6.

An embodiment also may include one or more recurrent neural networks that accept as input N-gram string patterns extracted from dynamic traces of operations. A recurrent neural network (RNN) is a class of artificial neural network wherein connections between nodes form a directed graph along a sequence. This allows the RNN to exhibit dynamic temporal behavior for a time sequence.

Input N-grams may be reformulated as pairs of [Training feature; Training target] as follows: [Training feature: (Operation i-k, Operation i-k+1, Operation i-k+2, . . . , Operation i−1); Training target: Operation i]. The purpose of training is as follows: given the operations observed at all time steps before step i, the module predicts the operation taken at time step i.

Figure 7:
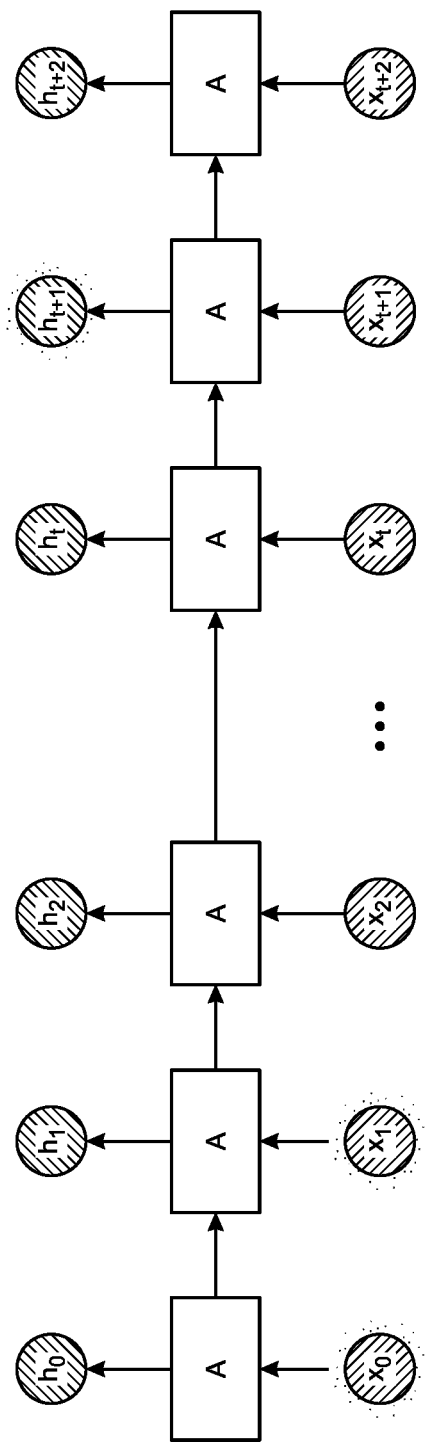
Figure 8:
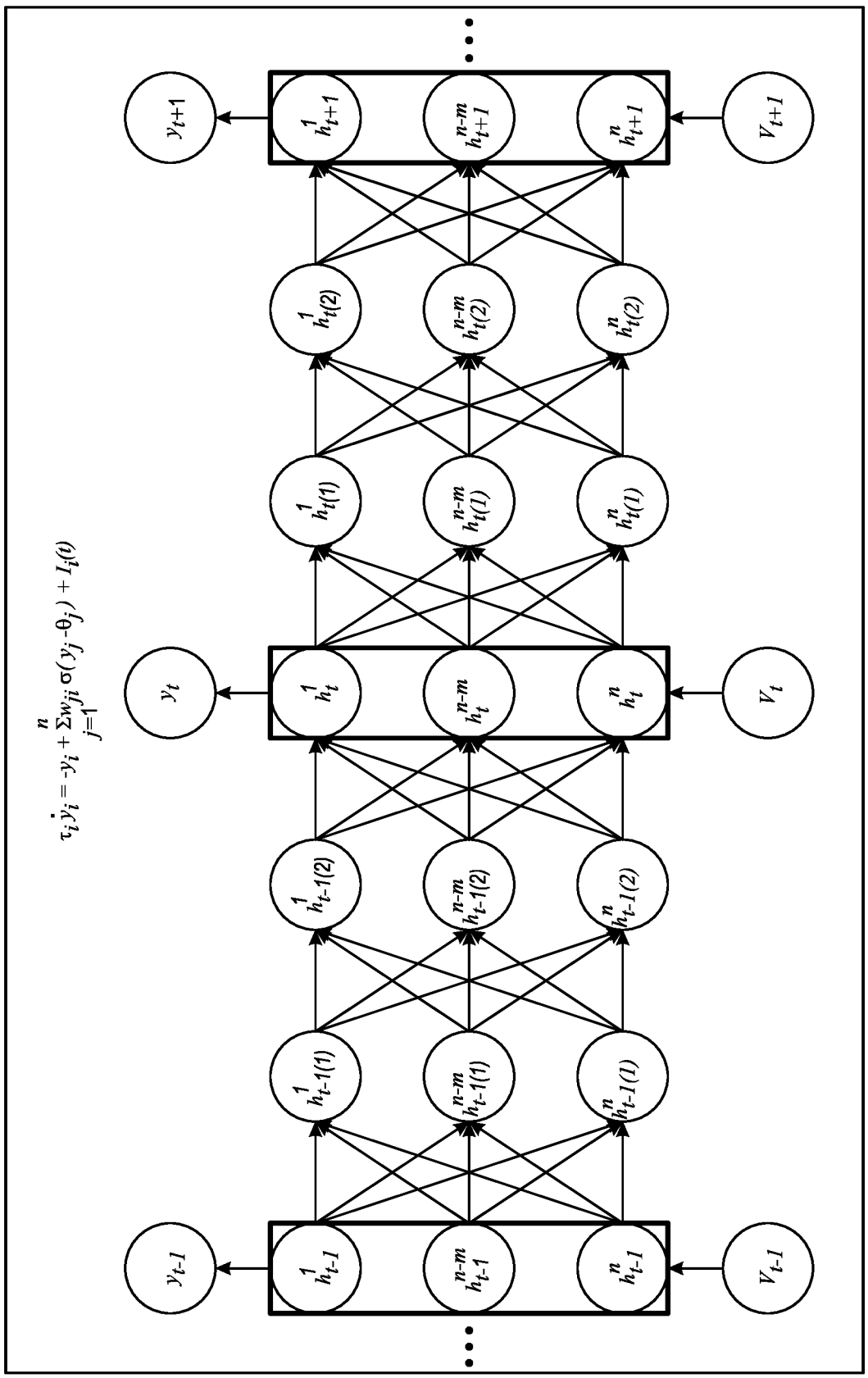

In an embodiment, one or more trained recurrent neural networks may have the structures depicted in FIG. 7 and/or FIG. 8. In FIG. 7, $X_t$ denotes observed operations, while $h_t$ denotes an embedding of each observed operation in the feature space. A denotes a neural network mapping function transforming the observed operation to the corresponding embedding variable. The output of the learning process may provide: (i) a temporal prediction model to estimate future operations; and (ii) an embedding representation of the operation sequence.

In a skip-gram module of an embodiment, the input is not constrained to be a single operation, but may include one or more unordered combinations of operations. The unordered combinations may be selected by other machine learning approaches, such as applying a Conditional Random Field (CRF) module to bags-of-words patterns extracted from dynamic traces, and selecting the most informative combinations of operations using the trained CRF module.

In an embodiment, the output of the skip-gram embedding may be a single vector. The length of the vector may correspond to a number of different operations in the dynamic trace data. The vector may represent, given any operation i as input, the probability of a randomly selected neighboring operation being operation j.

In an embodiment, the recurrent neural network module input is not constrained to be a sequence of single operations. Instead, the input to the recurrent neural network may include a temporal sequence of N-gram patterns. The N-gram patterns may be directly extracted using a sliding window traversing the dynamic trace data. The N-gram patterns may also include informative N-grams selected by performing other machine learning approaches, such as Hidden Markov Models, or Clustering, over all of the N-grams extracted from the dynamic trace data. The output of the recurrent neural network is a vector, and the length of the vector may correspond to the number of the N-gram strings. The vector represents the non-linear embedding of the N-gram strings.

The output of the skip-gram and recurrent neural network modules may be as follows: Given a dynamic trace (Operation 1, Operation 2, . . . , Operation N), using each operation as input, obtain an M-dimensional vector as the output from the skip-gram model. M is the number of different operations in the dynamic traces (usually M<N). Each of the dynamic traces may be mapped to an N×M-dimensional vector by the skip-gram module, which may be used to encode the patterns of the unordered combination of operations in the dynamic trace. Given the dynamic trace, if k-gram patterns are used by an N-gram module, S total N-grams may be generated from the head to the tail of the dynamic trace, and all of the k-grams form a temporal sequence of k-grams according to their temporal order. A recurrent neural net module of an embodiment may output an S-dimensional vector representing the embedding of the temporal sequence of k-grams, which in turn is used as the embedding representation of the dynamic trace. Thus, a vector formed by concatenating the output of the skip-gram embedding and of the recurrent neural network modules would be of dimension (N×M)+S.

Optionally, a Deep Neural Network (DNN) module may be used to map a feature vector generated by concatenating the output vectors from a skip-gram module and a recurrent neural network module to a lower- or higher-dimensional representation. The result may be used as input of an auto-encoder (described below). Various types of DNN may be used with various embodiments, and in one embodiment the DNN may be an identity mapping (input and output are the same vectors), in which case it is equivalent to using the combined output from the skip-gram model and the recurrent neural network directly as the input to the auto-encoder.

In an embodiment, a hidden layer of an autoencoder may include a series of neurons. Each neuron may calculate a linearly weighted combination of outputs from the neurons of the preceding layer. The linear combination calculated at each hidden layer neuron may be mapped to a scalar value using, for example, a non-linear transformation function, such as a sigmoid function or tan h function.

In an embodiment, a supervised auto-encoder may be configured to learn embeddings of the input vectors with the class information of those input vectors. Class information may include: (1) the exact class labels of each input (e.g., malware families, or malware vs. benign files); (2) partially observed labels (e.g., only the class labels of specific malware families are known, but nothing is known about their family labels or whether they are benign); (3) labels+ pairwise constraints. Inputs may be labeled or unlabeled. For unlabeled inputs, there may be a known similarity relation between the inputs (e.g., A and B are more similar than A and C). Labels may come, for example, from manual investigation of human security experts, an antivirus (AV) engine's scanning results, and/or a semi-automated scanning result output by an AV scanning script.

In an embodiment, class information may be used in an auto-encoder to force an embedding representation of the input vectors to follow a class consistency. For example, it may be required that embeddings of input vectors belonging to the same class should be the same or similar, or that embeddings of similar input vectors should be the same or similar. As an output of an auto-encoder, the learnt embedding representation may be used for better classification (e.g., malware family categorization), compared to traditional auto-encoders.

In an embodiment, a variational auto-encoder neural network may be trained in a supervised way, which means that the tuning of parameters in the auto-encoder may be guided by class information of input training data, as explained above. A supervised auto-encoder may be used to evaluate the importance of input features. The supervised auto-encoder may be trained by enforcing a sparsity constraint over the weights of neuron linkage. As a result, most of the linkage may have small weights, with only a small fraction of weights being of significantly larger magnitude. By calculating an accumulated weight value from one dimension of the input feature vector to the outputs of the auto-encoder, the impact of each feature dimension may be evaluated over the output of the auto-encoder, thus providing an importance evaluation of different feature dimensions.

In an embodiment, output from a supervised variational auto-encoder may include embedding feature vectors of the dynamic traces. These feature vectors may be used to perform classification of malware. Benefits of learning the feature vectors from the auto-encoder may include: (1) integration of both ordered and unordered patterns of operations and/or operation combinations in the dynamic trace data, thus producing a comprehensive description of the dynamic traces; and (2) encoding malware class information into the process of learning the embedding features, which produces more powerful features for malware classification.

A method embodiment may include combining supervised information (e.g., malware labels such as benign or malicious, or malware family names) and may include an auto-encoder to achieve automatic and interpretable malware feature extraction. In an embodiment, the supervised information may include exact class labels. Supervised information also may be formulated as weak label assignments (e.g., a fraction of the samples labeled while all the others are left unlabeled). The supervised information may be used to tune parameters in an autoencoder. In the derived (trained) auto-encoder, the feature representation generated by the auto-encoder may be used to differentiate different classes of samples in the feature space (since the feature representation is regularized by the supervised information).

In an embodiment, linkage parameters between neurons inside the trained weakly supervised auto-encoder may be used to identify the importance of features for malware detection. Furthermore, the magnitudes of the linkage parameters may be used to formulate the chains of decision for malware detection, which unveil how the classification on a given malware sample is made. This characteristic helps to determine how the raw feature profiles are combined and transformed to achieve accurate malware classification.

Embodiments described herein provide improved systems and methods for identifying and classifying malware, including malware which has not been previously identified. Such improved systems and methods improve the functionality of existing malware detection/analysis systems, and in turn may be used to improve the security of any computer system subject to the threat of malware. Consequently, the systems and methods described herein may improve the functioning of a computing device by detecting potentially malicious files with increased accuracy and thus reducing the computing device's likelihood of infection. These systems and methods may also improve the field of heuristic-based computer security and/or enterprise-level security of computer networks and systems by identifying new features and/or classes of malware that may be used to detect future malware.

Figure 2:
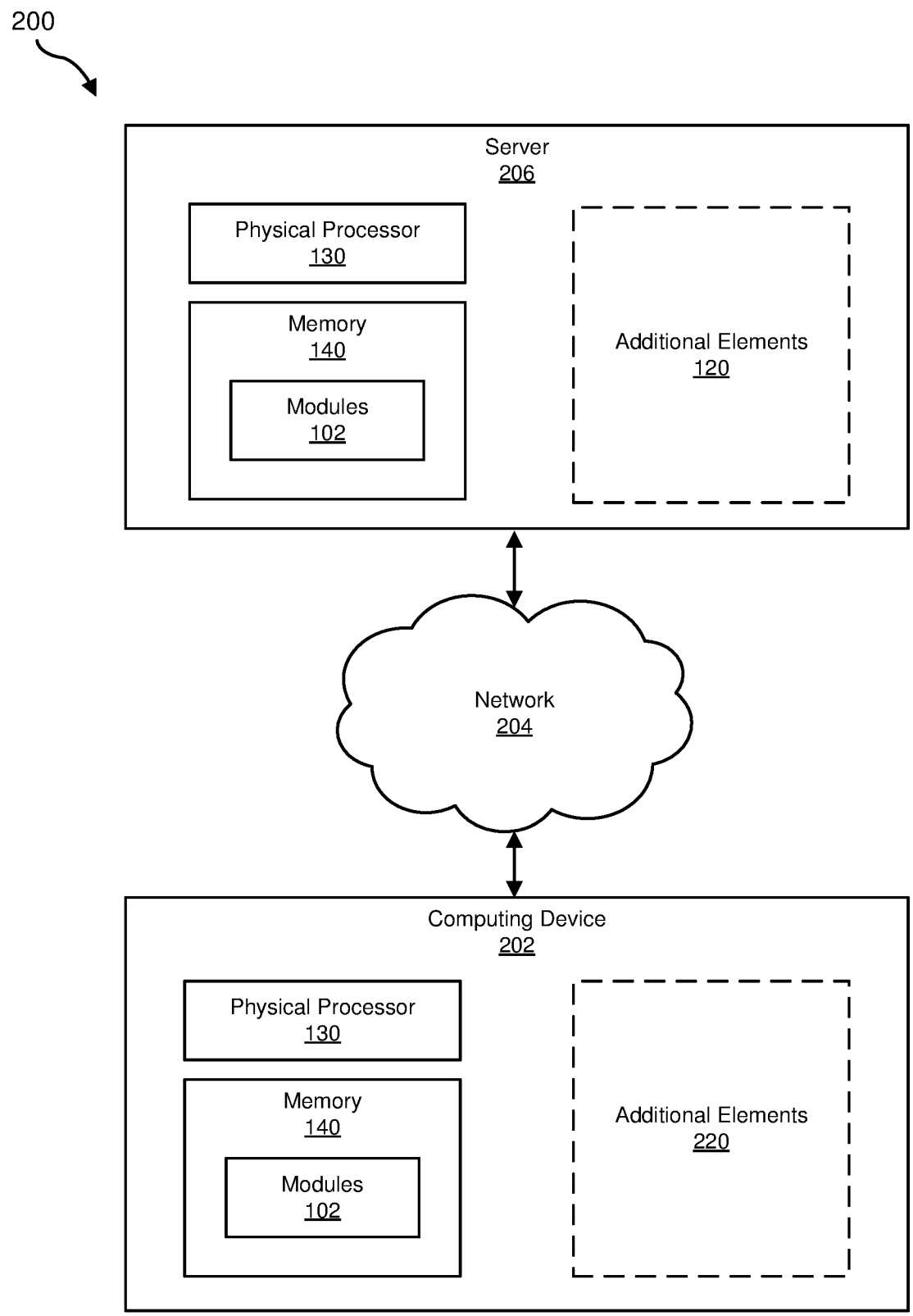
FIG. 2 is a block diagram of an additional example system for malware classification.

The following will provide, with reference to FIGS. 1-2, detailed descriptions of example systems for malware classification. Detailed descriptions of corresponding computer-implemented methods will also be provided in connection with FIG. 3. Detailed descriptions of further example embodiments are provided in connection with FIGS. 4-9. In addition, detailed descriptions of an example computing system and network architecture capable of implementing one or more of the embodiments described herein will be provided in connection with FIGS. 10 and 11, respectively.

FIG. 1 is a block diagram of an example system 100 for malware classification. As illustrated in this figure, example system 100 may include one or more modules 102 for performing one or more tasks. As will be explained in greater detail below, modules 102 may include a receiving module 104, an unordered event analysis module 106, an ordered event analysis module 108, and an autoencoder module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate malware classification. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. Examples of additional elements 120 may include, without limitation, a malware class information module, a feature mapping module, a vector combining module, etc.

Example system 100 in FIG. 1 may be implemented in a variety of ways. For example, all or a portion of example system 100 may correspond to portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to identify and detect malware. For example, and as will be described in greater detail below, one or more of modules 102 may cause computing device 202 and/or server 206 to perform one or more of the steps depicted in FIG. 3 and/or other methods described herein.

Computing device 202 generally represents any type or form of computing device capable of reading computer-executable instructions. Examples of computing device 202 include, without limitation, servers, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing as a server and includes the modules described herein. Examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Additional elements 220 generally represents any type or form of specialized processor. Examples of additional elements 220 may include, without limitation, a malware class information processor, a feature mapping processor, a graphics processing unit, etc.

Figure 3:
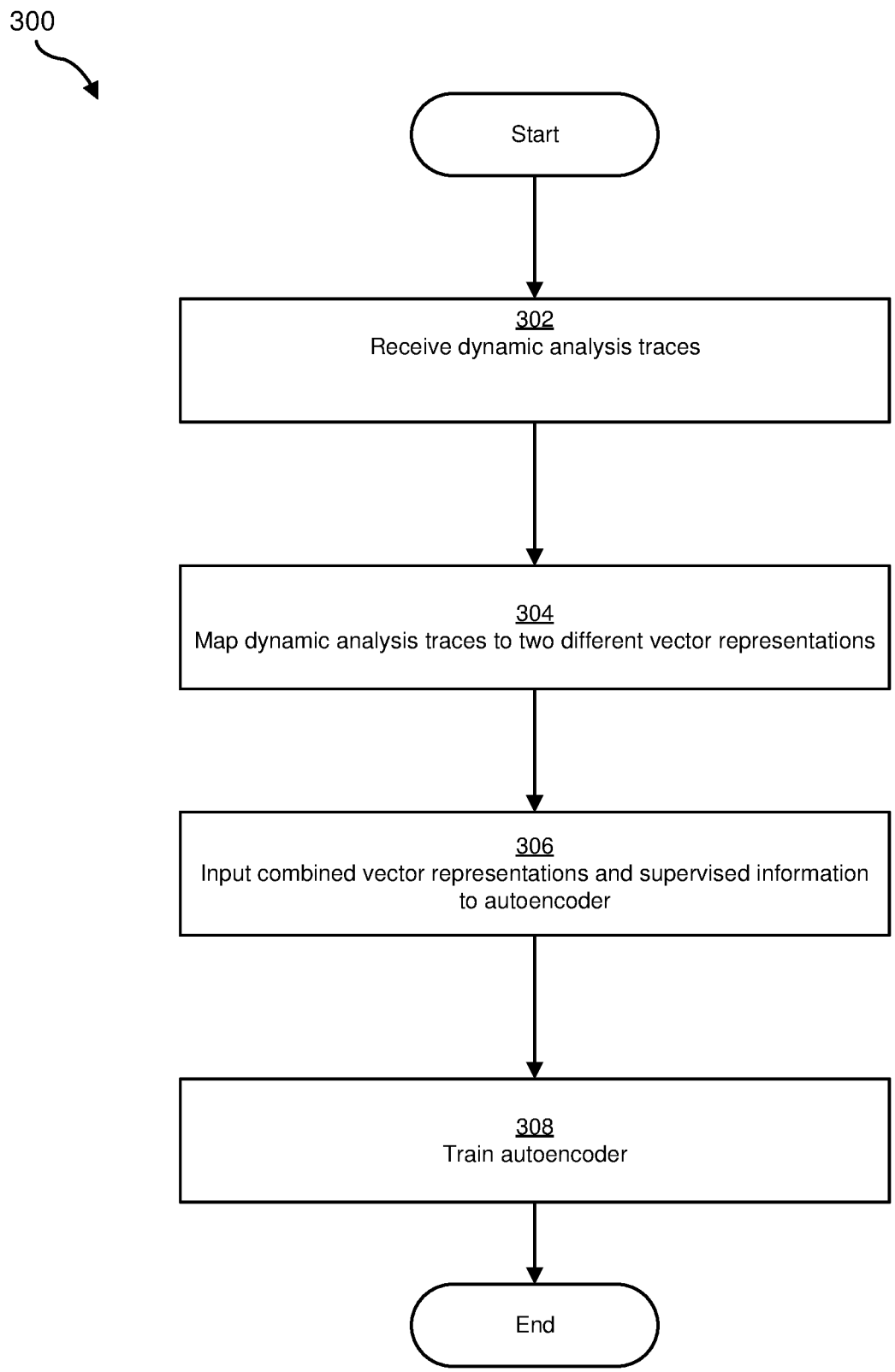
FIG. 3 is a flow diagram of an example method for malware classification.

FIG. 3 is a flow diagram of an example computer-implemented method 300 for malware classification. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive data describing behavior (events) performed by known malware. For example, receiving module 104 may, as part of computing device 202 in FIG. 2, receive dynamic analysis traces (e.g., text strings) describing actions performed by malware operating in a sandbox environment. Such actions may relate to events including one or more of: (a) file creation, deletion, and modifications; (b) mutex creation details; (c) domain names accessed; (d) IP addresses contacted; (e) processes created; (f) details regarding SSL (Secure Sockets Layer) certificates; (g) registry access behavior; and other events.

At step 304, the received traces may be analyzed. In an embodiment, the analysis may include two different processes. In the first process, the text strings may be mapped to a first set of vectors, without regard to the sequence of events. This first process may include a bags-of-words analysis and/or a skip-gram embedding, and may be performed by Unordered Event Module 106, depicted in FIG. 1.

In the second process, the text strings may be mapped to a second set of vectors, and the sequence of events is taken into account. This second process (which may occur before, after, or concurrently with the first process) may include an N-grams analysis and/or one or more recurrent neural networks, and may be performed by Ordered Event Module 108, depicted in FIG. 1. This process may include an LSTM (long short-term memory) word embedding performed over strings of events extracted from malware samples to generate non-linear abstract features. Moreover, either process may include further processing of the vectors (for example, by one or more Deep Neural Network (DNN) modules).

At step 306, the vectors output in step 304 (e.g., by modules 106 and 108) may be input to an Autoencoder Module 110 (see FIG. 1), along with supervised information. Examples of such supervised information may include, without limitation: labels of malware (benign or malicious, or malware family names); exact class labels; and weak label assignments (e.g. a fraction of samples labeled while all the others left unlabeled). The supervised information may be used to tune the parameters in the autoencoder.

At step 308, the autoencoder is trained and outputs a feature representation. Since it is regularized by the supervised information, the new feature representation generated by the auto-encoder can differentiate different classes of samples in the feature space. The linkage parameters between the neurons inside the trained (weakly) supervised auto-encoder may be used to visualize the importance of features for malware detection. Furthermore, the magnitudes of the linkage parameters can formulate the chains of decision for malware detection, which unveil how the classification on a given malware sample can be made. Feature extraction transforms data from an original, high-dimensional space to a relatively low-dimensional space, and this transformation may be linear or nonlinear.

Generally speaking, an autoencoder may include two parts, an encoder and a decoder. Considering a data sample X with n samples and m features, the output X' of the encoder may represent the reduced representation of X and the decoder may be tuned to reconstruct the original dataset X from the encoder's representation Y by minimizing the difference between X and X'. The encoder (a neural network) may map an input X to a hidden representation Y, and the decoder (another neural network) may map hidden representation Y to a "reconstruction" X'. Training an autoencoder may entail finding parameters that minimize the "reconstruction loss"—i.e., the difference (using some accepted measure) between X and X'. Since the encoding (which is simply the output of the hidden layer in the middle) typically has far less units than the input, the encoder must discard information. The encoder may learn to preserve as much of the relevant information as possible in the limited encoding, and intelligently discard irrelevant parts. The decoder learns to take the encoding and properly reconstruct it.

There are many types of autoencoder (stacked, relational, sparse, variational, denoising, etc.). Various embodiments described herein may use any suitable type of autoencoder. At least one embodiment may use a variational autoencoder. Unlike a standard autoencoder (whose encoder outputs a vector of, say, size n), a variational autoencoder's encoder may output two vectors of size n: a mean vector and standard deviation vector. The mean vector controls where the encoding of an input should be centered, while the standard deviation vector controls how far from the mean the encoding can vary.

Figure 4:
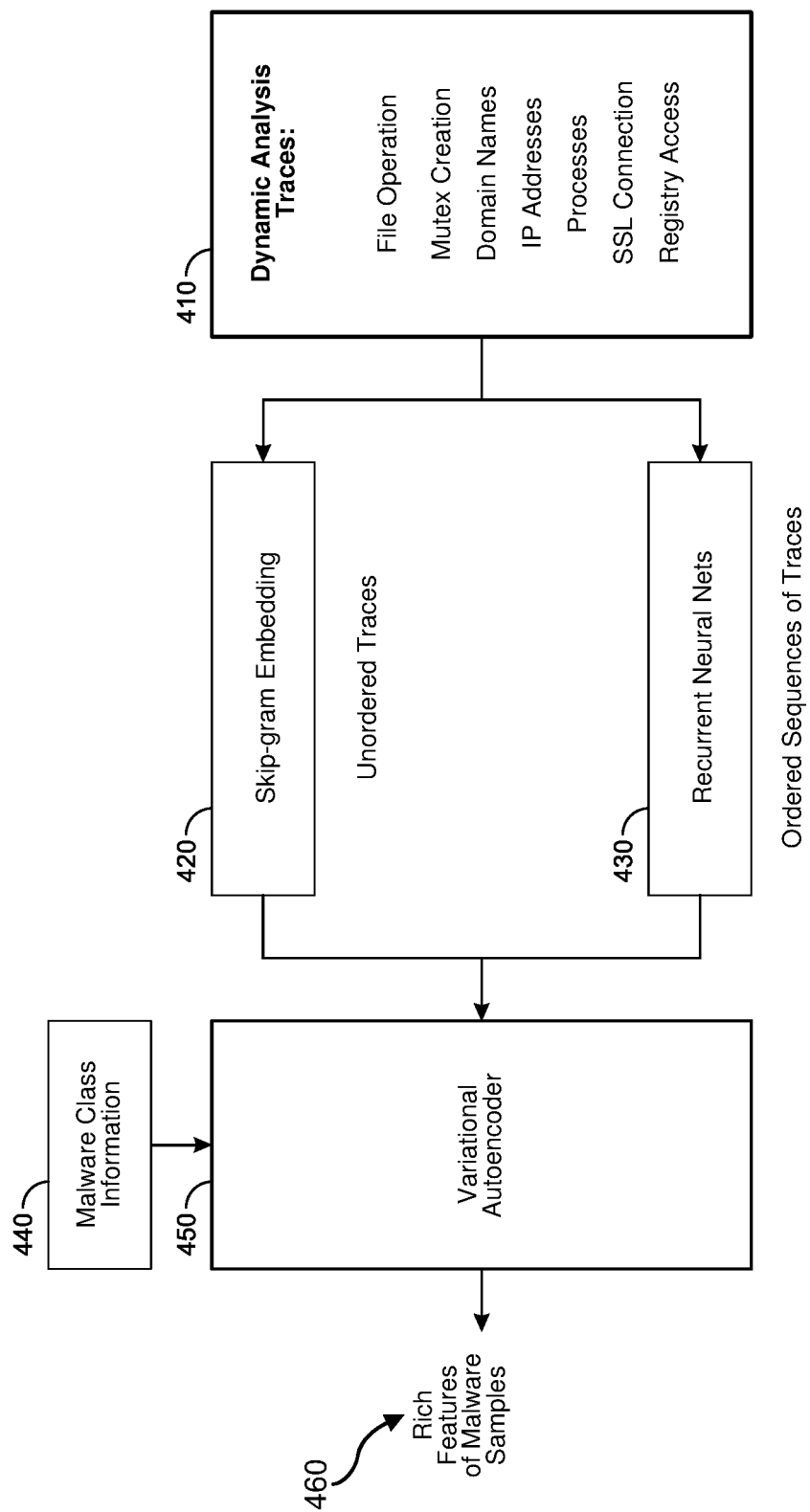
FIGS. 4-9 depict additional details of example method embodiments.

FIG. 4 depicts example architecture of an embodiment that may apply a skip-gram embedding to unordered traces and one or more recurrent neural networks to ordered sequences of traces. As shown in FIG. 4, dynamic analysis traces 410 may be received by a receiving module 104 (as depicted in FIG. 1). The receiving module may transmit the received traces to an Unordered Event Module 106 and an Ordered Event Module 108. In this embodiment, the Unordered Event Module 106 may implement bags-of-words and/or a skip-gram embedding 420 to process the text strings of the (unordered) event traces. Ordered Event Module 108 may implement N-grams and/or one or more recurrent neural networks 430 to process the text strings of ordered event traces.

The vectors output by modules 106 and 108 may be input to a Variational Autoencoder 450 (which may be implemented by Autoencoder Module 110), along with Malware Class Information 440. The output of Variational Autoencoder 450 may include rich features 460 of malware samples, to be used to identify out-of-sample malware.

FIG. 5 depicts example architecture of a skip-gram embedding module that may process unordered strings of operations received, for example, from a bags-of-words module of an embodiment. As depicted in FIG. 5, an input one-hot encoded vector (here, corresponding to the word "ants") is input to a neural network that may include a hidden layer of (300 linear) neurons. Each neuron may send its (weighted) output to each softmax classifier neuron in an output layer (here, that includes 10,000 neurons). Each softmax neuron may correspond to a separate word (abandon, ability, etc.) and the output of each neuron in the output layer may represent the probability that a word at a randomly chosen, nearby position is the word to which that neuron corresponds.

FIG. 6 depicts another example of skip-gram embedding architecture that may be applied to unordered traces. In FIG. 6, both the input vector x and the output y may be one-hot encoded word representations. The hidden layer may be a word embedding of size N. Given the vocabulary size V, the embedding may learn word embedding vectors of size N. The embedding may learn to predict one context word (output) using one target word (input) at a time. In FIG. 6, both input word $w_i$ and the output word $w_j$ may be one-hot encoded into binary vectors x and y of size V. The multiplication of the binary vector x and the word embedding matrix W of size V×N may produce an embedding vector of the input word $w_i$: the i-th row of the matrix W. This newly discovered embedding vector of dimension N may form the hidden layer. The multiplication of the hidden layer and the word context matrix W' of size N×W produces the output one-hot encoded vector y. The output context matrix W' may encode the meanings of words as context, different from the embedding matrix W. Note that W' may be independent of W. The function $L_O$ depicted in FIG. 6 is an example of a loss function that may be used in conjunction with a skip-gram embedding of an embodiment.

FIG. 7 depicts an example architecture of a recurrent neural network (RNN) that may be used in an embodiment. The RNN depicted in FIG. 7 may take as input n-gram string patterns extracted from dynamic traces of operations. As explained above, input N-grams may be reformulated as pairs of [Training feature; Training target] as follows: [Training feature: (Operation i-k, Operation i-k+1, Operation i-k+2, . . . , Operation i−1); Training target: Operation i]. The purpose of training may be as follows: given the operations observed at all time steps before step i, the module predicts the operation taken at time step i.

In FIG. 7, $X_t$ may denote observed operations, while he may denote an embedding of each observed operation in the feature space. A may denote a neural network mapping function transforming the observed operation to the corresponding embedding variable. The output of the learning process may provide: (i) a temporal prediction model to estimate future operations; and (ii) an embedding representation of the operation sequence.

FIG. 8 depicts another example of architecture that may be used with a recurrent neural network of an embodiment. The structure depicted in FIG. 8 may produce a rate of change of activation of a neuron i in the network with action potential $y_i$, where: $\tau_i$ is a time constant of postsynaptic node; $y_i$ represents activation of postsynaptic node; $\dot{y}_i$ (with over-dot) represents rate of change of activation of postsynaptic node; $w_{ji}$ represents weight of connection from pre to postsynaptic node; $\sigma(x)$ represents sigmoid of x; $y_j$ represents activation of presynaptic node; $\theta_j$ represents bias of presynaptic node; and $I_i(t)$ represents input (if any) to node.

Figure 9:
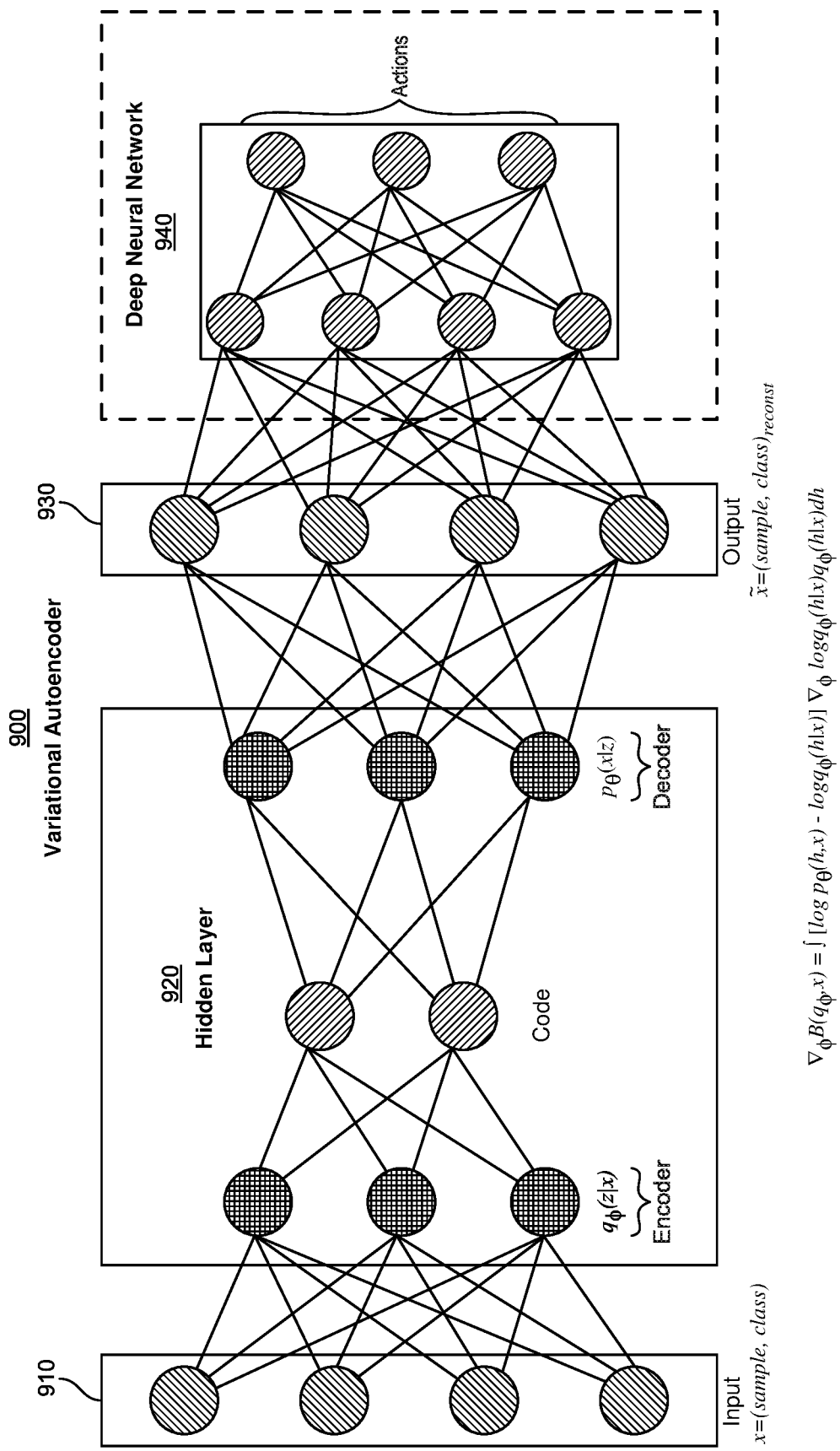

FIG. 9 depicts an example of an autoencoder that may be used in an embodiment. The variational autoencoder 900 depicted in FIG. 9 may include several different components: an input layer 910; a hidden layer 920, an output layer 930; and a deep neural network 940. Hidden layer 920 may include an encoder layer, a code layer, and a decoder layer.

Input layer 910 may receive as input samples (in vector form) and class information (perhaps in vector form), so that the input may have the form x=(sample, class). The output of input layer 910 may be received by hidden layer 920 and processed by the encoder layer, the code layer, and the decoder layer, which may send its output to output layer 930. The output of output layer 930 may have the form $\tilde{x}$=(sample, class)$_{reconst}$. The output of layer 930 may be fed to deep neural network layer 940 for further processing.

An embodiment may comprise architecture that incorporates class-distributed data into an example Variational Auto-Encoder (VAE) objective, by using the following priors to the variables in VAE:
 a. Assuming that x and y are the feature and class labels, respectively, of the same data object, and that z is the latent variable in VAE: y~Multinomial(y,π), where π is the prior probability of different classes, is a multinomial distribution.
 b. $p(z|y)=N(z|\mu_y,\Sigma_y)$ where N(|) may be the Gaussian distribution. $\mu_y$ may be the posterior mean of class y, and $\Sigma_y$ may be the posterior covariance of class y. The two posterior values may be given as constants in the supervised VAE training.

$$p(z) = \sum_y p(z|y)\pi(y)$$

may give the marginal distribution of the latent variable z.
 c. The objective function of training the supervised VAE may be as follows: $L(x,y,\theta)=E_{q(z|x)}(\log p(x|z))-KL(q(z|x)\|N(z|\mu_y,\Sigma_y))$, where KL denotes Kullback-Leibler Divergence.
 d. θ may represent the parameters of the learnt VAE (e.g., the neuron link weight and the parameters of the non-linear transformation inside each neuron).

Those skilled in the art will understand that the above details are intended merely to provide illustrative examples, and that embodiments described herein are not limited to those illustrative details. Moreover, the definitions cited herein are intended only to provide helpful information to the reader, and are not intended to limit the scope of the described embodiments in any manner.

One or more embodiments described herein may detect malware by leveraging mappings of dynamic analysis traces that include less data than the original traces, and therefore are more efficient to process. Since the described embodiments use a dataset that is smaller than those used by others, the system may use N-grams where N is bigger than 2 or 3. Moreover, once the N-grams and bags-of-words, for example, are generated, one or more embodiments may leverage automated feature extraction modules to discover the most powerful models for malware detection.

Also, by identifying higher level feature sets that may be used to classify potential malware, a malware detection system used in connection with an embodiment may be provided with a proactive detection tool that detects threats that are difficult to detect with regular methods such as white-/blacklisting, reputation, AV engines, etc. Both unordered patterns of operations (skip-gram model) and ordered patterns of operations (recurrent neural network) contained in the dynamic trace data of malware may be used by one or more of the embodiments described herein to conduct malware classification.

An embodiment may detect malware based on the feature sets and classifications described above. In response to detecting malware (e.g., by a detecting module), an embodiment may perform (e.g., via a security module) a security action to protect one or more computing devices from the detected computer malware. Examples of such security actions may include applying or executing a security patch, inoculation patch, and/or protective program, especially one that is specifically tailored, customized, and/or targeted to the detected malware. Additionally or alternatively, the security action may include powering down, turning off, quarantining, sandboxing, inoculating, isolating, throttling, and/or inhibiting one or more computing resources, such as a hardware, software, network, virtual, and/or firmware computing resource. Additionally or alternatively, the security action may include issuing a warning to a user or administrator, including a warning transmitted by text message, email, smart phone, pop-up, audio output, and/or forum message, etc. Additionally or alternatively, the security action may include enabling, heightening, turning on, and/or toggling one or more security settings, security features, security protocols, and/or security mechanisms.

Moreover, the unordered patterns and ordered patterns resulting from the dynamic traces may be integrated into a joint feature space using a supervised auto-encoder module, which may then be used for malware classification. In contrast to traditional auto-encoders, an embodiment comprising a supervised auto-encoder as described herein can integrate class information of malware (exact malware labels and/or pairwise constraints between malware samples (also known as "weak labels")) to enforce the learnt features of the dynamic trace data to be consistent with the class labels, and to derive accurate features for malware classification.

Further, embodiments comprising a supervised auto-encoder as described herein can also help to identify the most important input feature dimensions, corresponding to specific ordered or unordered operation patterns. Combining both ordered and unordered patterns of sequential data provides better results than using only one or the other type of pattern. The described embodiments therefore provide better flexibility of extracting sequential patterns from the raw trace data.

Figure 10:
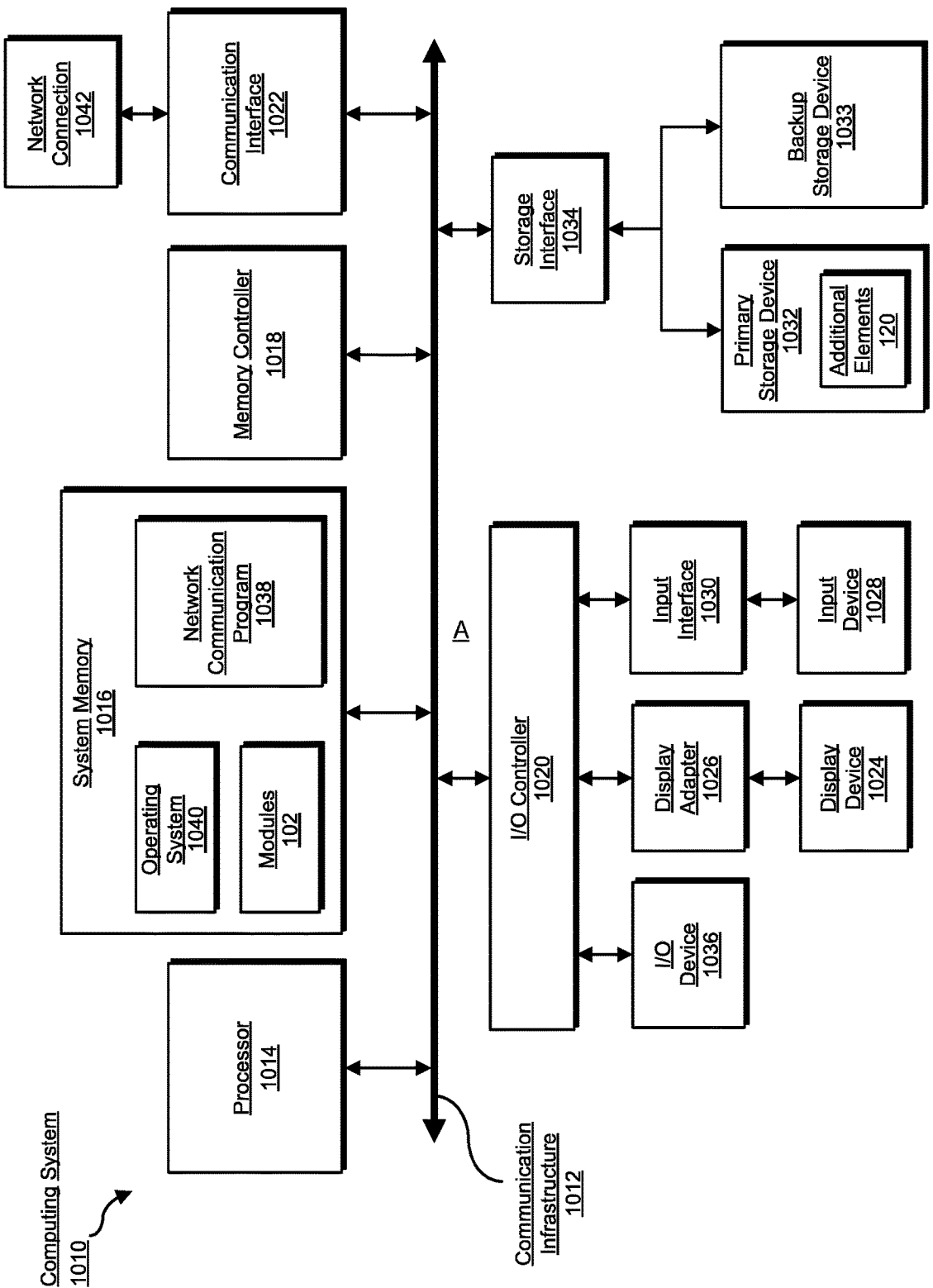
FIG. 10 is a block diagram of an example computing system capable of implementing one or more of the embodiments described and/or illustrated herein.

FIG. 10 is a block diagram of an example computing system 1010 capable of implementing one or more of the embodiments described and/or illustrated herein. For example, all or a portion of computing system 1010 may perform and/or be a means for performing, either alone or in combination with other elements, one or more of the steps described herein (such as one or more of the steps illustrated in FIG. 3). All or a portion of computing system 1010 may also perform and/or be a means for performing any other steps, methods, or processes described and/or illustrated herein.

Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of physical processing unit (e.g., a hardware-implemented central processing unit) capable of processing data or interpreting and executing instructions. In certain embodiments, processor 1014 may receive instructions from a software application or module. These instructions may cause processor 1014 to perform the functions of one or more of the example embodiments described and/or illustrated herein.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 102 from FIG. 1 may be loaded into system memory 1016.

In some examples, system memory 1016 may store and/or load an operating system 1040 for execution by processor 1014. In one example, operating system 1040 may include and/or represent software that manages computer hardware and software resources and/or provides common services to computer programs and/or applications on computing system 1010. Examples of operating system 1040 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

As illustrated in FIG. 10, computing system 1010 may also include at least one display device 1024 coupled to I/O controller 1020 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, example computing system 1010 may also include at least one input device 1028 coupled to I/O controller 1020 via an input interface 1030. Input device 1028 generally represents any type or form of input device capable of providing input, either computer or human generated, to example computing system 1010. Examples of input device 1028 include, without limitation, a keyboard, a pointing device, a speech recognition device, variations or combinations of one or more of the same, and/or any other input device.

Additionally or alternatively, example computing system 1010 may include additional I/O devices. For example, example computing system 1010 may include I/O device 1036. In this example, I/O device 1036 may include and/or represent a user interface that facilitates human interaction with computing system 1010. Examples of I/O device 1036 include, without limitation, a computer mouse, a keyboard, a monitor, a printer, a modem, a camera, a scanner, a microphone, a touchscreen device, variations or combinations of one or more of the same, and/or any other I/O device.

Communication interface 1022 broadly represents any type or form of communication device or adapter capable of facilitating communication between example computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution.

In some examples, system memory 1016 may store and/or load a network communication program 1038 for execution by processor 1014. In one example, network communication program 1038 may include and/or represent software that enables computing system 1010 to establish a network connection 1042 with another computing system (not illustrated in FIG. 10) and/or communicate with the other computing system by way of communication interface 1022. In this example, network communication program 1038 may direct the flow of outgoing traffic that is sent to the other computing system via network connection 1042. Additionally or alternatively, network communication program 1038 may direct the processing of incoming traffic that is received from the other computing system via network connection 1042 in connection with processor 1014.

Although not illustrated in this way in FIG. 10, network communication program 1038 may alternatively be stored and/or loaded in communication interface 1022. For example, network communication program 1038 may include and/or represent at least a portion of software and/or firmware that is executed by a processor and/or Application Specific Integrated Circuit (ASIC) incorporated in communication interface 1022.

As illustrated in FIG. 10, example computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, [additional elements 120] from FIG. 1 may be stored and/or loaded in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1010 may be configured as an Application Specific Integrated Circuit (ASIC) adapted to implement one or more of the example embodiments disclosed herein.

Figure 11:
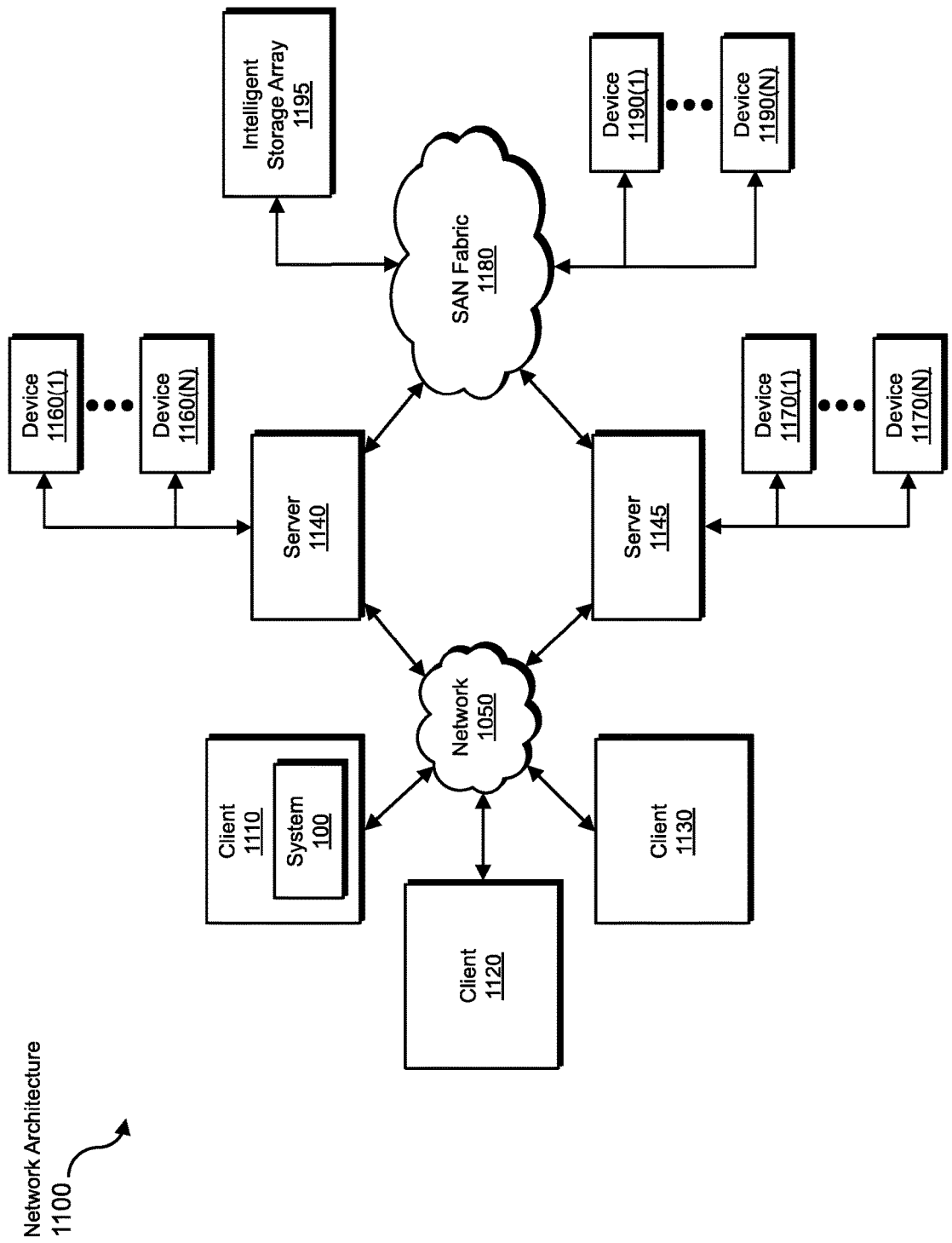
FIG. 11 is a block diagram of an example computing network capable of implementing one or more of the embodiments described and/or illustrated herein.

FIG. 11 is a block diagram of an example network architecture 1100 in which client systems 1110, 1120, and 1130 and servers 1140 and 1145 may be coupled to a network 1150. As detailed above, all or a portion of network architecture 1100 may perform and/or be a means for performing, either alone or in combination with other elements, one or more of the steps disclosed herein (such as one or more of the steps illustrated in FIG. 3). All or a portion of network architecture 1100 may also be used to perform and/or be a means for performing other steps and features set forth in the instant disclosure.

Client systems 1110, 1120, and 1130 generally represent any type or form of computing device or system, such as example computing system 1010 in FIG. 10. Similarly, servers 1140 and 1145 generally represent computing devices or systems, such as application servers or database servers, configured to provide various database services and/or run certain software applications. Network 1150 generally represents any telecommunication or computer network including, for example, an intranet, a WAN, a LAN, a PAN, or the Internet. In one example, client systems 1110, 1120, and/or 1130 and/or servers 1140 and/or 1145 may include all or a portion of system 100 from FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent Network-Attached Storage (NAS) devices configured to communicate with servers 1140 and 1145 using various protocols, such as Network File System (NFS), Server Message Block (SMB), or Common Internet File System (CIFS).

Servers 1140 and 1145 may also be connected to a Storage Area Network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to example computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the example embodiments disclosed herein may also be encoded as a computer program, stored in server 1140, run by server 1145, and distributed to client systems 1110, 1120, and 1130 over network 1150.

As detailed above, computing system 1010 and/or one or more components of network architecture 1100 may perform and/or be a means for performing, either alone or in combination with other elements, one or more steps of an example method for malware classification.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive dynamic analysis trace data to be transformed, transform the data via the steps described herein, output a result of the transformation to a memory, use the result of the transformation to classify and identify potential malware, and store the result of the transformation to a memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for malware classification, the method being performed by one or more computing devices comprising at least one processor, the method comprising:
  receiving, by the one or more computing devices, one or more dynamic analysis traces comprising event descriptions for a sequence of operations performed by a plurality of malware programs when executed in a controlled environment;
  receiving, by the one or more computing devices, one or more labels regarding classes of malware programs;
  performing, by the one or more computing devices, a first mapping of the event descriptions to a first set of N×M dimension vector representations that encode one or more patterns of an unordered combination of the operations, wherein:
    N is a total number of operations in the one or more dynamic analysis traces; and
    M is a number of different operations in the one or more dynamic analysis traces;
  performing, by the one or more computing devices, a second mapping of the event descriptions to a second set of S dimension vector representations that encode S number of contiguous sequences of the N total number of operations in the one or more dynamic analysis traces;
  concatenating the first set of vector representations and the second set of vector representations to form a third set of ((N×M)+S) dimension vectors representative of identified features of the plurality of malware programs;
inputting the third set of vector representations and the one or more labels into an autoencoder; and
training, by the one or more computing devices, the autoencoder by:
 tuning one or more parameters of the autoencoder based on the one or more labels; and
 generating a feature space representation for classifying malware that correlates the identified features of the plurality of malware programs with the classes of malware programs based on the third set of vector representations and the one or more parameters of the autoencoder.

2. The method of claim 1, further comprising detecting, by the one or more computing devices, computer malware based on output of the trained autoencoder.

3. The method of claim 2, further comprising, in response to detecting the computer malware, performing, by the one or more computing devices, a security action to protect the one or more computing devices from the detected computer malware.

4. The method of claim 3, wherein the security action comprises one or more of: powering down, turning off, quarantining, sandboxing, inoculating, isolating, throttling, or inhibiting one or more computing resources.

5. The method of claim 1, wherein the autoencoder comprises a variational autoencoder.

6. The method of claim 1, wherein the first mapping comprises a bags-of-words analysis.

7. The method of claim 1, wherein the first mapping comprises a skip-gram embedding.

8. The method of claim 1, wherein the second mapping comprises one or more recurrent neural networks.

9. The method of claim 1, wherein the second mapping comprises an N-gram analysis.

10. A system for malware classification, the system comprising:
at least one physical processor; and
physical memory comprising computer-executable instructions that, when executed by the physical processor, cause the physical processor to:
 receive one or more dynamic analysis traces comprising event descriptions for a sequence of operations performed by a plurality of malware programs when executed in a controlled environment;
 receive one or more labels regarding classes of malware programs;
 perform a first mapping of the event descriptions to a first set of N×M dimension vector representations that encode one or more patterns of an unordered combination of the operations, wherein:
  N is a total number of operations in the one or more dynamic analysis traces; and
  M is a number of different operations in the one or more dynamic analysis traces;
 perform a second mapping of the event descriptions to a second set of S dimension vector representations that encode S number of contiguous sequences of the N total number of operations in the one or more dynamic analysis traces;
 concatenate the first set of vector representations and the second set of vector representations to form a third set of ((N×M)+S) dimension vectors representative of identified features of the plurality of malware programs;
 input the third set of vector representations and the one or more labels into an autoencoder; and
 train the autoencoder by:
  tuning one or more parameters of the autoencoder based on the one or more labels; and
  generating a feature space representation for classifying malware that correlates the identified features of the plurality of malware programs with the classes of malware programs based on the third set of vector representations and the one or more parameters of the autoencoder.

11. The system of claim 10, wherein the computer-executable instructions, when executed by the physical processor, further cause the physical processor to detect computer malware based on output of the trained autoencoder.

12. The system of claim 11, wherein the computer-executable instructions, when executed by the physical processor, further cause the physical processor to, in response to detecting the computer malware, perform a security action to protect the system from the detected computer malware.

13. The system of claim 12, wherein the security action comprises one or more of: powering down, turning off, quarantining, sandboxing, inoculating, isolating, throttling, or inhibiting one or more computing resources.

14. The system of claim 10, wherein the autoencoder comprises a variational autoencoder.

15. The system of claim 10, wherein the first mapping comprises a skip-gram embedding.

16. The system of claim 10, wherein the second mapping comprises one or more recurrent neural networks.

17. A non-transitory computer-readable medium comprising one or more computer-executable instructions that, when executed by at least one processor of a computing device, cause the computing device to:
receive one or more dynamic analysis traces comprising event descriptions for a sequence of operations performed by a plurality of malware programs when executed in a controlled environment;
receive one or more labels regarding classes of malware programs;
perform a first mapping of the event descriptions to a first set of N×M dimension vector representations that encode one or more patterns of an unordered combination of the operations, wherein:
 N is a total number of operations in the one or more dynamic analysis traces; and
 M is a number of different operations in the one or more dynamic analysis traces;
perform a second mapping of the event descriptions to a second set of S dimension vector representations that encode S number of contiguous sequences of the N total number of operations in the one or more dynamic analysis traces;
concatenate the first set of vector representations and the second set of vector representations to form a third set of ((N×M)+S) dimension vectors representative of identified features of the plurality of malware programs;
input the third set of vector representations and the one or more labels into an autoencoder; and
train the autoencoder by:
 tuning one or more parameters of the autoencoder based on the one or more labels; and
 generating a feature space representation for classifying malware that correlates the identified features of the plurality of malware programs with the classes of malware programs based on the third set of vector representations and the one or more parameters of the autoencoder.

18. The non-transitory computer-readable medium of claim 17, wherein the one or more computer-executable instructions, when executed by at least one processor of the computing device, further cause the computing device to detect computer malware based on output of the trained autoencoder.

19. The non-transitory computer-readable medium of claim 18, wherein the one or more computer-executable instructions, when executed by at least one processor of the computing device, further cause the computing device, in response to detecting the computer malware, perform a security action to protect the computing device from the detected computer malware.

20. The non-transitory computer-readable medium of claim 19, wherein the security action comprises one or more of: powering down, turning off, quarantining, sandboxing, inoculating, isolating, throttling, or inhibiting one or more computing resources.

\* \* \* \* \*